(12) United States Patent
Malwitz et al.

(10) Patent No.: US 9,074,289 B2
(45) Date of Patent: Jul. 7, 2015

(54) ENVIRONMENTALLY FRIENDLY CORROSION INHIBITOR

(75) Inventors: Mark A. Malwitz, Richmond, TX (US); Daljinder K. Woloch, Richmond, TX (US)

(73) Assignee: NALCO COMPANY, Naperville, IL (US)

( * ) Notice: Subject to any disclaimer, the term of this patent is extended or adjusted under 35 U.S.C. 154(b) by 786 days.

(21) Appl. No.: 13/291,665

(22) Filed: Nov. 8, 2011

(65) Prior Publication Data

US 2013/0112106 A1  May 9, 2013

(51) Int. Cl.
*C23F 11/14* (2006.01)
*C09K 8/54* (2006.01)
*C09D 5/08* (2006.01)

(52) U.S. Cl.
CPC ............... *C23F 11/149* (2013.01); *C09K 8/54* (2013.01)

(58) Field of Classification Search
CPC .............................. C09K 8/54; E21B 41/02
USPC ............... 507/130, 240, 242, 939; 166/902; 422/12; 252/389.62, 400.62
See application file for complete search history.

(56) References Cited

U.S. PATENT DOCUMENTS

| | | | |
|---|---|---|---|
| 3,107,221 A * | 10/1963 | Harrison et al. | 507/242 |
| 3,404,094 A * | 10/1968 | Keeney | 507/242 |
| 3,514,410 A * | 5/1970 | Engle et al. | 134/41 |
| 3,773,465 A | 11/1973 | Kenney et al. | |
| 4,071,746 A * | 1/1978 | Quinlan | 252/392 |
| 4,141,416 A | 2/1979 | Holm | |
| 4,498,997 A * | 2/1985 | Walker | 507/240 |
| 4,541,946 A * | 9/1985 | Jones et al. | 252/189 |
| 4,734,259 A | 3/1988 | Frenier et al. | |
| 4,740,320 A | 4/1988 | Treybig et al. | |
| 4,851,396 A | 7/1989 | Lambert et al. | |
| 4,871,024 A | 10/1989 | Cizek | |
| 4,871,848 A | 10/1989 | Treybig et al. | |
| H751 H | 3/1990 | Sullivan et al. | |
| 4,997,040 A | 3/1991 | Cizek | |
| 5,000,873 A * | 3/1991 | Fisk et al. | 252/391 |
| 5,002,673 A | 3/1991 | Williams et al. | |
| 5,013,483 A | 5/1991 | Frenier et al. | |
| 5,130,034 A | 7/1992 | Williams et al. | |
| 5,132,093 A | 7/1992 | Hettiarachchi et al. | |
| 5,200,096 A | 4/1993 | Williams et al. | |
| 5,209,859 A | 5/1993 | Williams et al. | |
| 5,336,441 A * | 8/1994 | Shah et al. | 252/390 |
| 5,368,774 A * | 11/1994 | Borgard et al. | 252/391 |
| 5,697,443 A | 12/1997 | Brezinski et al. | |
| 5,756,004 A | 5/1998 | Brezinski | |
| 5,763,368 A * | 6/1998 | Brezinski | 507/240 |
| 5,779,938 A | 7/1998 | Naraghi et al. | |
| 5,854,180 A | 12/1998 | Sherubel et al. | |
| 6,180,057 B1 | 1/2001 | Taylor et al. | |
| 6,475,431 B1 | 11/2002 | Naraghi et al. | |
| 6,488,868 B1 | 12/2002 | Meyer | |
| 6,511,613 B1 | 1/2003 | Cizek et al. | |
| 7,057,050 B2 | 6/2006 | Meyer | |
| 7,118,615 B1 | 10/2006 | Miksic et al. | |
| 7,216,710 B2 | 5/2007 | Welton et al. | |
| 7,297,191 B1 | 11/2007 | Miksic et al. | |
| 7,842,127 B2 | 11/2010 | Malwitz | |
| 2005/0189113 A1 | 9/2005 | Cassidy et al. | |
| 2006/0186380 A1 | 8/2006 | Walker | |
| 2006/0201676 A1 | 9/2006 | Cassidy et al. | |
| 2006/0205609 A1 | 9/2006 | Cassidy et al. | |
| 2006/0264335 A1 | 11/2006 | Penna et al. | |
| 2007/0010404 A1 | 1/2007 | Welton et al. | |
| 2007/0069182 A1 | 3/2007 | Cassidy et al. | |
| 2007/0071887 A1 | 3/2007 | Cassidy et al. | |
| 2007/0187648 A1 | 8/2007 | Welton et al. | |
| 2008/0146464 A1 * | 6/2008 | Malwitz | 507/240 |
| 2008/0308770 A1 | 12/2008 | Tiwari | |
| 2010/0291307 A1 | 11/2010 | McGee et al. | |
| 2011/0152137 A1 * | 6/2011 | Taylor | 507/240 |

FOREIGN PATENT DOCUMENTS

WO    WO 98/23792    6/1998

OTHER PUBLICATIONS

US 5,543,380, 8/1996, Williams et al. (withdrawn).

* cited by examiner

*Primary Examiner* — Joseph D Anthony
(74) *Attorney, Agent, or Firm* — Benjamin Carlsen

(57) ABSTRACT

Disclosed and claimed is a method of inhibiting corrosion of a surface in contact with a corrosive environment encountered in oil and gas operations. The method includes contacting the surface with a composition comprising a quaternary nitrogen-containing corrosion inhibitor having the following general formula.

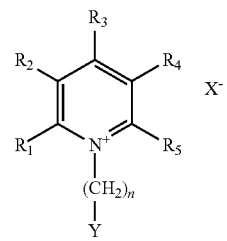

The composition is preferably adherent to standards for environmental friendliness but has equal applicability in formulations that include conventional corrosion inhibitors.

17 Claims, No Drawings

ENVIRONMENTALLY FRIENDLY CORROSION INHIBITOR

TECHNICAL FIELD

This invention relates generally to compositions and methods for environmentally friendly oil and gas industry corrosion inhibitors. More specifically, the invention relates to compositions including a quaternary nitrogen-containing corrosion inhibitor that meets current "green" chemistry regulations which have reduced environmental impact. The invention has particular relevance to corrosion inhibitors that meet three of the North Sea criteria benchmarks of biodegradation, bioaccumulation, and toxicity.

BACKGROUND OF THE INVENTION

To meet the significant growth in oil and gas demand today, exploration is moving to uncharted, ultra-deep water locations and production is being considered in locations previously considered to be off-limits. Further, much of the existing infrastructure typically operates well beyond its designed capabilities. This overreach creates significant technical challenges in all areas of production; however, no challenge is more difficult than preserving infrastructure integrity.

Corrosion inhibitors are frequently introduced into oil and gas fluids to aid in maintaining infrastructure integrity. Corrosion inhibitors are added to a wide array of systems and system components, such as cooling systems, refinery units, pipelines, steam generators, and oil or gas producing and production water handling equipment. These corrosion inhibitors are geared towards combating a large variety of corrosion types. For example, a common type of corrosion encountered in well bores is acid induced corrosion where the degree of corrosion depends on a multitude of factors. These factors include, for example, the corrosiveness of the fluid, pipeline metallurgy, temperature, time of corrosive fluid contact time, and pressure.

Acids and acid solutions have long been used in the stimulation of oil wells, gas wells, water wells, and similar boreholes. Acid stimulation is performed in wells completed in subterranean formations. Acid stimulation generally falls into two categories: (i) matrix acidizing and (ii) fracturing acidizing. In matrix acidizing the acid flows through the natural permeability and porosity of the formation. In fracturing acidizing, the acid travels primarily through natural or induced fractures in the formation. In both stimulation methods, the well treating acid solutions, usually hydrochloric acid (HCl), mixtures of HCl and hydrofluoric acid (HF), or organic acids (e.g., acetic acid), are pumped through the well tubular goods and injected into the formation where the acid attacks formation materials increasing its permeability to oil and/or gas. To protect the equipment and tubular goods from the corrosive effects of the acid, the well treating acid almost always includes a corrosion inhibitor, frequently referred to as an acid corrosion inhibitor or ACI. The literature suggests the use of additives to extend the effectiveness of the acid corrosion inhibitors, including organic and inorganic halide salts (e.g., cuprous iodide and ammonium iodide) as disclosed in U.S. Pat. Nos. 3,773,465; 4,871,024; 4,997,040; and 7,842,127.

Injection of a high performance inhibitor at the appropriate location and optimum dosage can be extremely effective at reducing corrosion rates, such as on pipe walls. Observing a greater than 95% decrease in corrosion is not uncommon. Performance is typically determined through several techniques, such as electrical resistance probes, coupon measurements, autoclave tests, and inspection readings. In some cases, however, corrosion inhibitor performance may deteriorate over time, particularly in systems that have a tendency to accumulate significant quantities of solids or in systems that have had previous corrosion to the metal surfaces.

Stringent governmental regulations have imposed environmental constraints on the oil and gas producing industry. These regulations have led to the need for new "greener" chemistries, which have reduced environmental impact. The environmental impact of any chemical can be defined, in part, by three criteria: biodegradation, bioaccumulation, and toxicity. All three criteria have benchmarks that must be met for a chemical to be permitted for use (e.g., the North Sea area of operations), with different emphasis on each depending on which regulating body controls the waters. This environmental drive has been spearheaded by North Sea Regulators (e.g., CEFAS) and their success has sparked similar programs, currently being implemented in other oil producing regions. Operators now frequently demand identical levels of performance with existing treatments along with the fulfillment of the new environmental criteria for any chemicals that may be contained, for example, in rig overboard discharge.

In view of these challenges, there exists an ongoing need for improved, and in particular environmentally friendly, corrosion inhibitors. Specifically, corrosion inhibitors having high levels of biodegradability, low potential to bioaccumulate, and low aquatic toxicity while maintaining adequate corrosion inhibition are desirable. Simultaneously protecting a system from corrosion caused by the presence of introduced and naturally occurring acidic species as well as bacterial byproducts would also be highly desirable.

SUMMARY OF THE INVENTION

This invention accordingly provides an environmentally friendly method of inhibiting corrosion of a surface in a corrosive environment encountered in oil and gas operations (e.g., oil field or upstream). The corrosion inhibitor composition used in the method of this invention is predicted to have a better ecological and toxicity profile than currently available corrosion inhibitors. The corrosion inhibitor composition can be formulated with no priority pollutants (as categorized by the US EPA) and the components of the novel formulation can be classified either Norway "yellow" or "green." In embodiments, the corrosion inhibitor composition of the invention may be mixed with other corrosion inhibitors, chemistries, or additives that may or may not be environmentally friendly or priority pollutants.

Quaternary nitrogen compounds (commonly referred to as quats) have been used extensively due to their ability to form a film on the surface of steel, stability over a wide range of pH and temperature, cost effectiveness, and efficiency in sour conditions (see, for example, U.S. Pat. Nos. 7,057,050; 6,488,868; 5,336,441; and 5,756,004 and WO 2003042428 A1). However, due to their inherent biostatic properties their biotoxicity profiles are often unacceptable and (pat compounds are generally not readily biodegradable, are toxic, and tend to bioaccumulate. It was therefore unexpected and surprising to discover that the quaternary nitrogen compounds of the present invention can exhibit a more favorable bioaccumulative, biotoxicity and biodegradability profile compared to current technologies.

In a preferred aspect, the method of the invention includes contacting a surface in a corrosive environment encountered in oil and gas operations with an environmentally friendly composition comprising a quaternary nitrogen-containing corrosion inhibitor having the general formula:

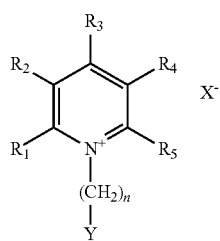

The variables in the general formula represent the following: (i) n is an integer from 1 to 4; (ii) $R_1$, $R_2$, $R_3$, $R_4$) and $R_5$ are each independently selected from H, —$(CO_2H)_W$ (i.e., di-carboxylic acid), —$(CO_2R_6)_X$ (i.e., di-ester), —$(C(=O)NR_7R_8)_W$ (i.e., di-amido), —$C(O)NR_7R_8$, —$N(H)C(=O)R_8$, tetrazolyl, substituted tetrazolyl, alkoxy, dialkoxy, alkyl, substituted alkyl, dialkyl, substituted dialkyl, amine, substituted amine, and combinations thereof; wherein $R_6$ is a $C_1$-$C_8$ alkyl or phenyl, $R_7$ is H or a $C_1$-$C_4$ alkyl, $R_8$ is H or a $C_1$-$C_4$ alkyl, W is 1 or 2, and X is 1 or 2; (iii) Y is selected from napthyl, benzyl, anthracyl, phenanthrinyl, substituted napthyl, substituted benzyl, substituted anthracyl, substituted phenanthrinyl, and combinations thereof; and (iv) $X^-$ is a counterion with a charge sufficient to balance the positive charge on the parent compound of the general formula.

In an aspect the composition retains dispersibility in an acidic environment and can be either batch mixed or mixed onsite just prior to application (e.g., on-the-fly or in situ) in the oilfield corrosive environment.

It is an advantage of the invention to provide an environmentally friendly corrosion inhibitor for surfaces exposed to a corrosive environment encountered in oil and gas operations.

It is another advantage of the invention to provide novel corrosion inhibitors that can be classified as Norway "yellow" or "green" for inhibiting corrosion of surfaces exposed to a corrosive environment encountered in oil and gas operations.

It is a further advantage of the invention to fill an industrial need for effective corrosion inhibitors that have a minimal environmental impact particularly in areas that have stringent environmental regulations.

It is yet another advantage of the invention to retain dispersibility in an acidic fluid for at least 24 hours.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE INVENTION

The quaternary nitrogen-containing corrosion inhibitor of the present invention can be used in any system exposed to fluids (i.e., liquid, gas, slurry or mixture thereof) containing a metal corrosion agent where improved corrosion inhibition is desired. However, the corrosion inhibitors of the present invention are particularly well-suited for use in corrosive environments encountered in oil and gas operations and refinery operations. The amount of active ingredient in a corrosion inhibitor formulation required to sufficiently reduce the rate of corrosion varies with the system in which it is used. Methods for monitoring the severity of corrosion in different systems are well-known to those skilled in the art, and may be used to decide the effective amount of active ingredient required in a particular situation. The compounds may be used to impart the property of corrosion inhibition to a composition for use in an oil or gas application and may have one or more functions other than corrosion inhibition (e.g. scale inhibition).

The present invention is effective in inhibiting corrosion in various metallurgies and a variety of well treating acids used in the oil field. Types of metallurgy include, for example, mild steels (such as N80, L80, J55), high chrome steels (e.g., 13Cr85), and coil tubing (e.g., CT900). Representative well treating acids include hydrochloric acid (HCl), hydrofluoric acid (HF), mixtures of HCl and HF (i.e., mud acid), acetic acid, formic acid, other organic acids, and anhydrides. The most common acids are 3% HCl, 7½% HCl, 10% HCl, 15% HCl, 28% HCl, and mud acid. Mud acid is typically a blend of 3 to 12% HCl and 1 to 6% HF.

It should be appreciated that the described methods may be used in any system exposed to fluids (e.g., liquid, gas, slurry, or mixtures thereof) containing a metal corrosion agent where improved corrosion inhibition is desired. The corrosion inhibitor formulation of the invention may be used in a variety of petroleum operations in the oil and gas industry. The compounds of the invention are particularly well suited for use in oil and gas field applications, refinery operations, and oil and gas transmission systems. With respect to such oil and gas field applications, the described compounds are typically added to oil, water, and/or gas fluids in the form of a solution or dispersion in water or an organic solvent. In embodiments, it can be used to treat systems used in primary, secondary and tertiary oil and gas recovery. The inhibitor formulation may be introduced to such systems in accordance with techniques well-known to those skilled in the art. The inhibitor formulation may also be used to inhibit acid solution in well-acidizing operations such as oil wells, gas wells, water wells, and similar boreholes.

In an embodiment, this invention is a method of inhibiting corrosion of a surface in contact with a corrosive environment encountered in oil and gas operations.

The method includes contacting the surface with a composition comprising a quaternary nitrogen-containing corrosion inhibitor having the general formula:

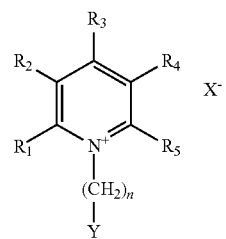

The variables in the general formula represent the following: (i) n is an integer from 1 to 4; (ii) $R_1$, $R_2$, $R_3$, $R_4$, and $R_5$ are each independently selected from H, —$(CO_2H)_W$ (i.e., di-carboxylic acid), —$(CO_2R_6)_X$ (i.e., di-ester), —$(C(=O)NR_7R_8)_W$ (i.e., di-amido), —$C(=O)NR_7R_8$, —$N(H)C(=O)$ $R_8$, tetrazolyl, substituted tetrazolyl, alkoxy, dialkoxy, alkyl, substituted alkyl, dialkyl, substituted dialkyl, amine, substituted amine, and combinations thereof, wherein $R_6$ is a $C_1$-$C_8$ alkyl or phenyl, $R_7$ is H or a $C_1$-$C_4$ alkyl, $R_8$ is H or a $C_1$-$C_4$ alkyl, W is 1 or 2, and X is 1 or 2; (iii) Y is selected from napthyl, benzyl, substituted napthyl, substituted benzyl, substituted anthracyl, substituted phenanthrinyl, and combinations thereof; and (iv) $X^-$ is a counterion with a charge sufficient to balance the positive charge on the parent compound of the general formula. Representative counterions include, for example, halides (e.g., (fluoride) F, (chloride) $Cl^-$, (bromide) $Br^-$, (iodide) $I^-$, and combinations thereof), hexafluorophosphates (e.g., $PF_6^-$), nitrates (e.g., $NO_3^-$), nitrites (e.g., $NO_2^-$), acetates (e.g., $C_2H_3O_2^-$), bicarbonates (e.g., $HCO_3^-$), cyanides (e.g., $CN^-$), perchlorates (e.g., $ClO_4^-$), hydroxides (e.g., $OH^-$), sulfates (e.g., $SO_4^{2-}$), sulfites (e.g., $SO_3^{2-}$), mesylates (e.g., $CH_3SO_3^-$), the like, and combinations thereof.

In an embodiment, $R_1$, $R_2$, $R_3$, $R_4$, and $R_5$ are each independently selected from: —C(=O)NH($R_8$) (i.e., substituted amido), tetrazolyl, and —N(H)C(=O)$R_8$ (i.e., amido), —$CO_2H$ (i.e., carboxylic acid), —$CO_2R_6$ (i.e., ester), —C(=O)$NH_2$ (i.e., amido), and —C(=O)$NR_7R_8$.

In an embodiment, $R_1$, $R_2$, $R_3$, $R_4$, and $R_5$ are each independently selected from: —C(=O)NH($R_8$) (i.e., substituted amido), tetrazolyl, and —N(H)C(=O)$R_8$ (i.e., amido).

In an embodiment, $R_1$, $R_2$, $R_3$, $R_4$, and $R_5$ are each independently selected from: —$CO_2H$ (i.e., carboxylic acid), —$CO_2R_6$ (i.e., ester), —C(=O)$NH_2$ (i.e., amido), and —C(=O)$NR_7R_8$.

In an embodiment, Y in the general formula above is selected from: benzyl, naphthyl, anthracyl, phenanthrinyl, and combinations thereof.

In an embodiment, Y in the general formula above is selected from: substituted benzyl, substituted naphthalenyl, substituted anthracyl, substituted phenanthrinyl, and combinations thereof.

In an embodiment, Y in the general formula above is selected from: substituted benzyl, substituted naphthalenyl, substituted anthracyl, substituted phenanthrinyl, benzyl, naphthyl, anthracyl, phenanthrinyl, and combinations thereof.

In an embodiment, the substituent groups in the substituted napthyl, substituted benzyl, substituted anthracyl, and substituted phenanthrinyl are groups selected from: cyano, amino, aminoalkyl, cycloalkyl, aryl, arylalkyl, alkyl, alkoxy, hydroxyl, ester, and combinations thereof.

In an embodiment, the substituent groups in the substituted napthyl, substituted benzyl, substituted anthracyl, and substituted phenanthrinyl are groups selected from: cyano, amino, aminoalkyl, cycloalkyl, aryl, arylalkyl, and combinations thereof.

In an embodiment, the substituent groups in the substituted napthyl, substituted benzyl, substituted anthracyl, and substituted phenanthrinyl comprise groups selected from: alkyl, alkoxy, hydroxyl, ester, and combinations thereof.

In an embodiment, the quaternary nitrogen-containing corrosion inhibitor is selected from at least one of the following structures. The functional group on the pyridine ring can be in the 2, 3, or 4 position according to alternative embodiments.

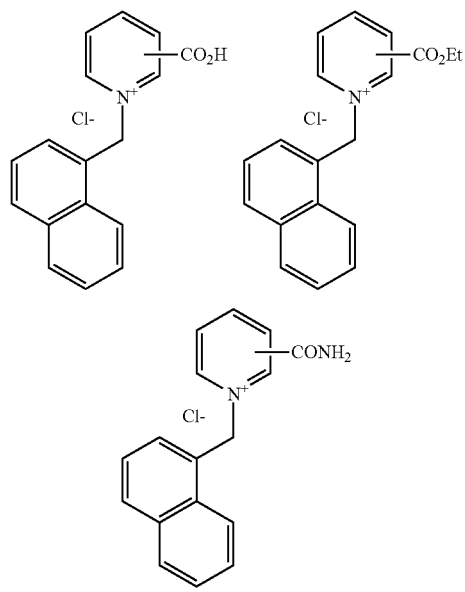

In an embodiment, the quaternization reaction between ethyl isonicotinate and 1-(chloromethyl)naphthalene gives a reaction mixture where one representative structure of the product is a quaternary nitrogen-containing corrosion inhibitor and has the following structure (Compound 1).

An example of the North Sea criteria for this structure is as follows: (i) biodegradation rate of 75%, (ii) Log $P_{ow}$ of 2.7, and (iii) acute aquatic toxicity of 13.1 mg/L (*skeletonema*).

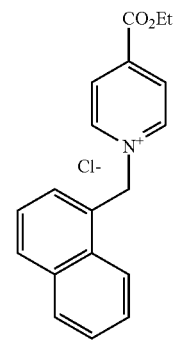 [SMILES: CCOC(=O)c1cc[n+](Cc2cccc3ccccc23)cc1 ; [Cl-]]

In an embodiment, the quaternary nitrogen-containing corrosion inhibitor has the following structure (Compound 2).

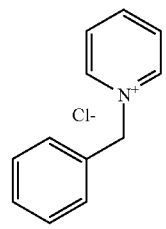 [SMILES: c1ccc(C[n+]2ccccc2)cc1 ; [Cl-]]

In an embodiment, the quaternary nitrogen-containing corrosion inhibitor has the following structure (Compound 3).

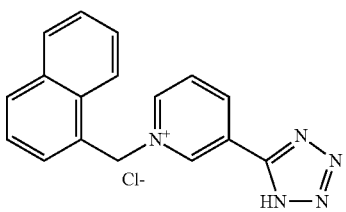 [SMILES: c1ccc2c(C[n+]3cccc(-c4nnn[nH]4)c3)cccc2c1 ; [Cl-]]

In an embodiment, the quaternary nitrogen-containing corrosion inhibitor has the following structure (Compound 4).

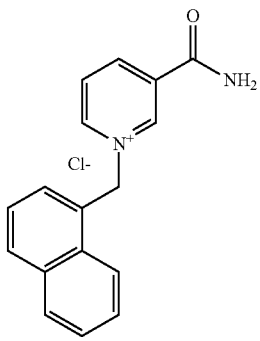 [SMILES: NC(=O)c1ccc[n+](Cc2cccc3ccccc23)c1 ; [Cl-]]

In an embodiment, the quaternary nitrogen-containing corrosion inhibitor has the following structure (Compound 5).

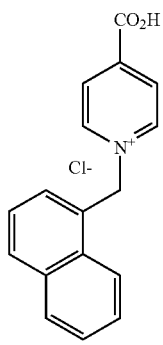 [SMILES: O=C(O)c1cc[n+](Cc2cccc3ccccc23)cc1 ; [Cl-]]

In an embodiment, the quaternary nitrogen-containing corrosion inhibitor is at least one of the following reaction products or a mixture of at least two of the following reaction products. This mixture is represented as Compound 6 in the examples below.

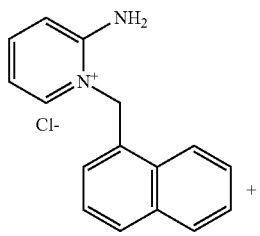

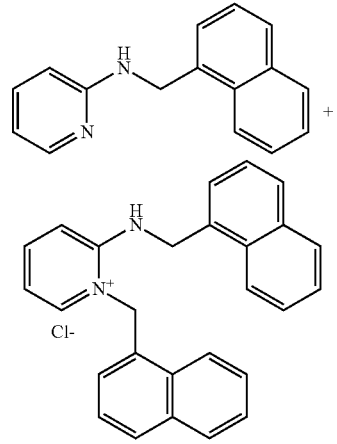

In an embodiment, the quaternary nitrogen-containing corrosion inhibitor has the following structure. This structure is represented as Compound 7 in the example below.

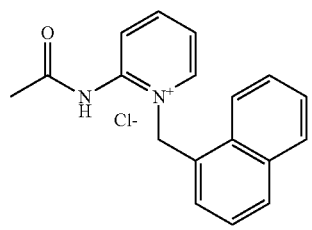 [SMILES: CC(=O)Nc1cccc[n+]1Cc1cccc2ccccc12 ; [Cl-]]

In an embodiment, the corrosion inhibitor intermediate composition of the invention comprises from about 5 to about 50 weight percent of at least one quaternary nitrogen-containing corrosion inhibitor dispersed or dissolved in one or more organic solvents. In embodiments, at least one quaternary nitrogen-containing corrosion inhibitor intermediate is present from about 0.1-80 weight % is preferred; about 10-60 weight % more preferred; or about 20-50 weight % most preferred.

The inhibitors of the present invention are useful in inhibiting corrosion of a steel surface in contact with an acidic fluid. The corrosion inhibitor formulation is introduced into the well treating acid at a concentration sufficient to coat the well tubulars and equipment. In a preferred method, the inhibitor is added either "on-the-fly" or batch mixed with the acidizing fluid prior to injection.

In practice, the inhibitors of the present invention are added to an effective treating amount of acid solution which then makes contact with the well tubulars and equipment to penetrate a subterranean formation. The dosage rate of the acid corrosion inhibitor formulation is dependent on the metallurgy of the well being protected, type of acid used, acid concentration, duration of acid exposure in the well, well temperature, well pressure, and the presence of other chemistries or additives (i.e. external intensifiers, iron control agents, anti-sludge materials, etc.). Based on these parameters, typical corrosion inhibitor doses range from about 0.01 to 80 gallons per thousand gallons or about 0.1% to 8% by volume (based on total volume of injected fluid) when blended in an acid to provide sufficient corrosion inhibition. Analyzing corrosion rates and pitting values of metal coupons in an autoclave test helps determine optimal dosage ranges to provide satisfactory protection of well tubulars and equipment.

In an embodiment, the formulation is produced by blending the ingredients into a homogeneous mixture. The formulation components can be mixed in any order. Typical components can include organic solvents, surfactants, unsaturated aldehydes, quaternary amine compounds, dispersants, and intensifier/co-extender (e.g., formic acid compounds or potassium iodide). After addition of all components the mixture is allowed to stir until a homogeneous mixture is present.

Examples of suitable solvents are alcohols such as primary alcohols (e.g., methanol, ethanol, propanol, the like, and combinations thereof), secondary alcohols (e.g., isopropanol, isobutanol, secondary butanol, the like, and combinations thereof), and tertiary alcohols (e.g., t-butanol, the like, and combinations thereof), glycols (e.g., ethylene glycol, ethylene glycol monobutyl ether, propylene glycol, 1,3-propanediol, the like, and combinations thereof), glycerol, aliphatic and aromatic hydrocarbons, the like, and combinations thereof. In some embodiments, the described compounds are sparingly or fully water-soluble and as such compositions may be suitably formulated in a mixture of water and one or more alcohols or glycols. Similarly, the described compounds may be suitably formulated in an aromatic naptha, such as heavy aromatic naptha, by incorporating one or more alcohols or glycols in the composition.

In embodiments, the corrosion inhibitor of the invention includes at least one solvent such as polar aprotic solvents, esters, aromatic solvents, terpenoids, terpenes, ionic solvents, acetals, alcohols, the like, and combinations thereof. If present, solvents are generally present in the composition from about 1-70 weight %; about 5-60 weight % more preferred; or about 10-55 weight % most preferred.

Representative polar aprotic solvents include, for example, DMF (dimethylformamide), DMPU (dimethyl pyrimidinone), DMSO (dimethyl sulfoxide), DMA (dimethylacetamide), NMP (N-methylpyrrolidone), DMAC (dimethyl acetamide), tetrahydrofuran (THF), acetonitrile, acetone, the like, and combinations thereof.

Representative esters include, for example, ethylene carbonate, ethyl lactate, methyl acetate, isobutyl acetate, methyl formate, n-butyl acetate, the like, and combinations thereof.

Representative aromatic solvents include, for example, benzene, toluene, xylene, heavy aromatic naptha, the like, and combinations thereof.

Representative acetals include, for example, dimethoxymethane, dibutoxymethane, glycerol formal, diethoxymethane, the like, and combinations thereof.

Representative alcohols include, for example, methanol, ethanol, isopropanol (IPA), propanol, butanol, isobutanol, tert-butanol, ethylene glycol, diethylene glycol, propylene glycol, 1,3-propanediol, butanediol, glycerine, the like, and combinations thereof.

In an embodiment, the composition of the invention includes at least one solvent selected from: glycerine; ethyl lactate; propylene glycol; 1,3-propanediol; ethylene glycol; water; the like, and combinations thereof.

In an embodiment, either in combination with a solvent or not, the composition of the invention includes at least one surfactant. Representative surfactants include, for example, nonionic polyoxyethylene surfactants such as ethoxylated alkyl phenols and ethoxylated aliphatic alcohols, polyethylene glycol esters of fatty, resin and tall oil acids and polyoxyethylene ester of fatty acids or anionic surfactants such as linear alkyl benzene sulphonate, alkyl sulphonate, alkyl ether phosphonates, ether sulphates, sulphosuccinates, and ether carboxylates. In embodiments, surfactants may be linear or branched $C_8$-$C_{12}$ with 7-15 moles ethylene oxide/hydroprobe (See e.g., U.S. Pat. No. 7,842,127). If the surfactant component is present, it is generally present in the composition of the invention ranging from about 0.01-30 weight %; about 0.01-15 weight % more preferred; or about 0.01-10 weight % most preferred.

In embodiments, the corrosion inhibitor composition of the invention includes at least one intensifier, such as formic acid, formic acid compounds, unsaturated aldehydes (e.g., cinnamaldehyde, α-, β-unsaturated aldehydes, the like, and combinations thereof) iodide salts, the like and combinations thereof (See e.g., U.S. Pat. Nos. 4,734,259; 5,013,483; 7,842,127). Intensifiers may be present in the composition in any suitable amount. Generally, intensifiers are present from about 0.1-65 weight %; about 0.1-60 weight % more preferred; or about 5-50 weight % most preferred.

Other compounds that may also be blended with the compositions claimed herein are quaternary amines, such as fatty, cyclic, or aromatic amines quaternized with lower alkyl halides or benzyl chloride and certain amides. In addition, mutual solvents may be used to increase the solubility and improve compatibility for all the components. The described compositions may also contain components that are typically included in corrosion inhibiting compositions, such as scale inhibitors and/or surfactants. Examples of suitable formulations are provided in Table 1.

TABLE 1

ACI Formulations

| Formulation | Quaternary Nitrogen Compounds | Solvent A | Solvent B | Non-ionic Surfactant | Intensifier |
|---|---|---|---|---|---|
| A.1 | 37% | 10% | 7% | 6% | 40% |
| A.2 | 36% | 17% | 6% | 9% | 32% |
| A.3 | 20% | 30% | 0% | 10% | 40% |
| A.4 | 20% | 0% | 30% | 10% | 40% |
| A.5 | 23% | 30% | 12% | 0% | 35% |
| A.6 | 32% | 0% | 30% | 8% | 30% |
| A.7 | 36% | 11% | 7% | 6% | 40% |

In Table 1, percentages are in weight percent based on the total weight of the composition. The formulations were evaluated for their ability to inhibit acid induced corrosion. Because corrosion inhibitors (e.g., acid corrosion inhibitors) contain complex mixtures of several compounds all in a balanced, stable formula the success of a formulation was also based on the stability of the formulation over several weeks at various temperature ranges.

It will be apparent to those skilled in the art that the provided examples are non-limiting and are merely illustrative. Also, the reaction schematics specifying particular intermediates and final products illustrate only those compounds presumed as significant compounds formed based on current principles of organic reaction chemistry and qualitative infrared analysis of the final reaction product of the corrosion inhibitor. Illustration of a specified corrosion inhibitor does not exclude the presence of other significant corrosion inhibitors or corrosion inhibitor intermediate(s) important to the formation of the final product. Further, illustration of a final compound does not exclude the presence of other compounds in the final composition, including, without limitation, the unreacted starting reactants, intermediates, and other final compound(s), if any, produced by competing reaction pathways.

In an aspect the composition retains dispersibility in an acidic environment and can be either batch mixed or mixed onsite just prior to application (e.g., on-the-fly or in situ) in the oilfield corrosive environment. Dispersibility is the ability of a complex mixture of components in a fluid to maintain a homogenous solution where there is no phase separation or precipitation occurring. Dispersibility of a corrosion inhibitor formulation in an acidic solution is important because it allows for the ability to pump a homogeneous mixture without separation or precipitation of the individual components.

The bioaccumulation potential of chemical substances has generally been determined from the n-octanol/water partition coefficient (expressed as log $P_{ow}$) and the bioconcentration factor. The log $P_{ow}$ represents the ratio of a material that dissolves or disperses in octanol (the oil phase) versus water. This coefficient is used as a chemical surrogate for bioaccumulative potential. A log $P_{ow}$ of less than ten is preferred, a log $P_{ow}$ of less than six is more preferred, and a log $P_{ow}$ of less than three is most preferred.

Biodegradation is the chemical breakdown of a material by microorganisms into nutrients that can be used by other organisms. Generally, a complex molecule can be broken down into carbon dioxide, water, microbial biomass, and/or inorganic salts. A biodegradation of 10% or greater is preferred, biodegradation of 20% or greater is more preferred, and a biodegradation of 60% or greater is most preferred.

Aquatic toxicity is an important environmental parameter to measure because many aquatic species readily uptake chemicals making them sensitive to their surrounding environment. Due to the multitude of trophic levels found in a marine environment chemical exposure can lead to indications of bioaccumulation. Generally, three trophic levels are measured for acute toxicity: green algae, daphnia, and fish. An aquatic toxicity of 1.0 mg/L or greater is preferred, aquatic toxicity of 10 mg/L or greater is more preferred, and an aquatic toxicity of 100 mg/L or greater is most preferred for any of the aquatic species measured.

The foregoing may be better understood by reference to the following examples, which are intended for illustrative purposes and are not intended to limit the scope of the invention or its application in any way.

Examples 1-7 show various representative methods used in the preparation of the corrosion inhibitors of the invention. It should be understood that one skilled in the art could use any suitable synthetic technique to prepare the corrosion inhibitors or corrosion inhibitor intermediates of the invention.

Example 1

Compound 1. In a 100 mL 3-neck round bottom flask equipped with a magnetic stirrer, thermometer, and reflux condenser was added 40 g of ethylene glycol. To this stirred solution was added 5 g of ethyl isonicotinate (33 mmol) followed by 6.4 g of 1-(chloromethyl)naphthalene (33 mmol). The reaction mixture was heated to 140° C. and maintained at that temperature overnight. The reaction mixture was formulated to give the final corrosion inhibitor product.

Example 2

Compound 2. The quaternary amine salt was prepared according to the procedure in Example 1, using 5.0 g of pyridine (40 mmol) and 12.2 g of 1-(chloromethyl)naphthalene (49 mmol). The reaction mixture was formulated to give the final corrosion inhibitor product.

Example 3

Compound 3. In a 250 mL 3-neck round bottom flask equipped with a magnetic stirrer, thermometer, and reflux condenser was added 96 mL water. To the water solution was added 5 g of 2-cyanopyridine (48 mmol), followed by 5.4 g zinc bromide (24 mmol) and 4.7 g of sodium azide (72 mmol). The reaction mixture was vigorously stirred and refluxed for 24 h. The reaction mixture was cooled to room temperature and acidified to pH=3. The reaction mixture was allowed to stir for an additional 0.5 h and the white solid was filtered. The white colored solid was washed with water and allowed to dry. The resultant solid underwent the quaternization reaction according to the procedure in Example 1, using 1-(chloromethyl)naphthalene in ethylene glycol. The reaction mixture was formulated to give the final corrosion inhibitor product.

Example 4

Compound 4. In a 100 mL 3-neck round bottom flask equipped with a magnetic stirrer, thermometer, and reflux condenser was added 40 g of propylene glycol. To this stirred solution was added 5 g of nicotinamide (41 mmol) followed by 7.9 g of 1-(chloromethyl)naphthalene (44 mmol). The reaction mixture was heated to 100° C. and maintained at that temperature for about two hours. The mixture was then purged with nitrogen, cooled to room temperature, and filtered through a frit glass filter. The reaction mixture was formulated to give the final corrosion inhibitor product.

Example 5

Compound 5. The quaternary amine salt was prepared according to the procedure in Example 4, using 5.0 g of isonicotinic acid (40 mmol) and 8.6 g of 1-(chloromethyl) naphthalene (49 mmol) in propylene glycol. The reaction mixture was formulated to give the final corrosion inhibitor product.

Example 6

Compound 6. The quaternary amine salt was prepared according to the procedure in Example 1 using 5 g of 2-aminopyridine (53 mmol) and 9.4 g of 1-(chloromethyl)naphthalene (53 mmol) in ethylene glycol. The reaction mixture was formulated to give the final corrosion inhibitor product.

Example 7

Compound 7. To a solution of dichloromethane was added 2-aminopyridine. To this reaction mixture was added acetic anhydride dropwise and the reaction mixture was refluxed for four hours. The resulting solution was evaporated to dryness using a rotary evaporator. The solid was recrystallized using ethyl acetate. The resulting crystalline solid underwent the quaternization reaction according to the procedure in Example 1, using 1-(chloromethyl)naphthalene in ethylene glycol. The reaction mixture was formulated to give the final corrosion inhibitor product.

Example 8

Corrosion Testing

A common mode of testing the effectiveness of a corrosion inhibitor involves simulating downhole corrosive conditions by using an autoclave and measuring corrosion rates. Corrosion rates were determined using three different metallurgies (N80, Cr13, and CT900) in a simulated treatment fluid of an aqueous mixture of hydrochloric acid. A 100 mL solution of treatment fluid was added to a selected amount (indicated as gallons per thousand or GPT) of corrosion inhibitor formulations of the invention (see Tables 2-8) and in some cases compared against a commercially available corrosion inhibitor (indicated as Commercial A in Tables 4-7). External intensifiers were also added to the treatment fluid as indicated. The amount of formic acid used is given in GPT and the amount of potassium iodide (KI) used is given in pounds per thousand (PPT). The selected test coupons were then added to the inhibited acid mixtures and these mixtures were then placed in a high temperature and pressure corrosion autoclave unit simulator. The coupons remained in the autoclave at a pressure of 3000 psi for the test duration. The coupons were then removed, cleaned, and weighed to obtain their weight loss. The corrosion value is reported in $lb/ft^2$. The coupons were also visually inspected for any pitting corrosion and assigned a value of 0-7.

Generally speaking, corrosion rates of <0.05 $lb/ft^2$ and pitting values of 0-3 are considered acceptable while pitting and corrosion values higher than that indicate differing degrees of failure. To determine if the inhibitors in the present invention were able to inhibit acid induced corrosion the ACI formulations A.1-A.7 were tested using N80 steel at 300° F. and 3000 psi for six hours in 15% HCl (Table 2). Based on the ability to prevent acid induced corrosion and stability, ACI A.3 was selected to further investigate the corrosion protection capabilities with the use of an external intensifier such as formic acid using N80 steel at 300° F. and 3,000 psi for six hours in 15% HCl. Table 3 shows that ACI A.3 is able to successfully inhibit corrosion with the use of an external intensifier such as formic acid with N80 steel at 300° F. and 3,000 psi for six hours in 15% HCl. ACI A.3 was further investigated for its ability to inhibit corrosion at various temperatures and with several metallurgies. These tests were carried out side by side with a widely used corrosion inhibitor Commercial A. The results from these comparison corrosion tests are shown in Tables 4-7. The data in Tables 4 through 7 shows that ACI A.3 inhibited acid-induced corrosion for several metallurgy types at rates less than 0.05 $lb/ft^2$ and resulted in pitting values of 0 at a wide range of temperatures. Acid corrosion inhibitor A.3 successfully inhibited corrosion in 15% HCl at various temperatures including 250° F., 200° F., 150° F., and 100° F. for all three metal types tested (Tables 4-7). ACI A.3 showed corrosion rates and pitting values that were comparable to that of corrosion inhibitor Commercial A. ACI A.3 also successfully inhibited corrosion in all three metal types at various temperatures in 28% HCl (Table 8).

TABLE 2

Corrosion Inhibitor Data at 3000 psi, 15% HCl, 300° F.

| ACI | Dose (GPT) | Metal | Time (hours) | Average Corrosion ($lb/ft^2$) | Pitting Number | Pitting Description |
|---|---|---|---|---|---|---|
| A.1 | 20 | N80 | 6 | 0.0452 | 0 | General Corrosion |
| A.2 | 20 | N80 | 6 | 0.0600 | 5 | Significant Surface/Edge Pitting |
| A.3 | 20 | N80 | 6 | 0.0659 | 0 | General Corrosion |
| A.4 | 20 | N80 | 6 | 0.0530 | 0 | General Corrosion |
| A.5 | 20 | N80 | 6 | 0.0585 | 0 | General Corrosion |
| A.6 | 20 | N80 | 6 | 0.1222 | 0 | General Corrosion |
| A.7 | 20 | N80 | 6 | 0.0471 | 0 | General Corrosion |

TABLE 3

Corrosion Inhibitor Data at 3000 psi, 15% HCl, 300° F.

| ACI | Dose (GPT) | Metal | Time (hours) | Formic Acid (GPT) | Average Corrosion ($lb/ft^2$) | Pitting Number | Pitting Description |
|---|---|---|---|---|---|---|---|
| A.3 | 20 | N80 | 6 | 10 | 0.0390 | 0 | General Corrosion |
| A.3 | 20 | N80 | 6 | 20 | 0.0314 | 0 | General Corrosion |
| A.3 | 20 | N80 | 6 | 30 | 0.0290 | 0 | General Corrosion |
| A.3 | 10 | N80 | 6 | 10 | 0.0406 | 0 | General Corrosion |
| A.3 | 10 | N80 | 6 | 20 | 0.0293 | 0 | General Corrosion |
| A.3 | 10 | N80 | 6 | 30 | 0.0242 | 0 | General Corrosion |

TABLE 4

Corrosion Inhibitor Data at 3000 psi, 15% HCl, 250° F.

| ACI | Dose (GPT) | Metal | Time (hours) | Formic Acid (GPT) | Average Corrosion ($lb/ft^2$) | Pitting Number | Pitting Description |
|---|---|---|---|---|---|---|---|
| Inhibitor A.3 | 6 | N80 | 6 | 20 | 0.0133 | 0 | General Corrosion |
| Commercial A | 6 | N80 | 6 | 20 | 0.0093 | 0 | General Corrosion |
| Inhibitor A.3 | 10 | Cr13 | 6 | 30 | 0.0172 | 0 | General Corrosion |
| Commercial A | 10 | Cr13 | 6 | 30 | 0.0124 | 0 | General Corrosion |
| Inhibitor A.3 | 6 | CT900 | 6 | 20 | 0.0139 | 0 | General Corrosion |
| Commercial A | 6 | CT900 | 6 | 20 | 0.0109 | 0 | General Corrosion |

TABLE 5

Corrosion Inhibitor Data at 3000 psi, 15% HCl, 200° F.

| ACI | Dose (GPT) | Metal | Time (hours) | KI (PPT) | Average Corrosion (lb/ft$^2$) | Pitting Number | Pitting Description |
|---|---|---|---|---|---|---|---|
| Inhibitor A.3 | 4 | N80 | 6 | 0 | 0.0088 | 0 | General Corrosion |
| Commercial A | 4 | N80 | 6 | 0 | 0.0051 | 0 | General Corrosion |
| Inhibitor A.3 | 6 | Cr13 | 6 | 5 | 0.0047 | 0 | General Corrosion |
| Commercial A | 6 | Cr13 | 6 | 5 | 0.0034 | 0 | General Corrosion |
| Inhibitor A.3 | 4 | CT900 | 6 | 5 | 0.0039 | 0 | General Corrosion |
| Commercial A | 4 | CT900 | 6 | 5 | 0.0025 | 0 | General Corrosion |

TABLE 6

Corrosion Inhibitor Data at 3000 psi, 15% HCl, 150° F.

| ACI | Dose (GPT) | Metal | Time (hours) | KI (PPT) | Average Corrosion (lb/ft$^2$) | Pitting Number | Pitting Description |
|---|---|---|---|---|---|---|---|
| Inhibitor A.3 | 2 | N80 | 24 | 0 | 0.0147 | 0 | General Corrosion |
| Commercial A | 2 | N80 | 24 | 0 | 0.0029 | 0 | General Corrosion |
| Inhibitor A.3 | 4 | Cr13 | 24 | 0 | 0.0079 | 0 | General Corrosion |
| Commercial A | 4 | Cr13 | 24 | 0 | 0.0063 | 0 | General Corrosion |
| Inhibitor A.3 | 2 | CT900 | 24 | 0 | 0.0030 | 0 | General Corrosion |
| Commercial A | 2 | CT900 | 24 | 0 | 0.0051 | 4 | Surface/Edge Pitting |

TABLE 7

Corrosion Inhibitor Data at 3000 psi, 15% HCl, 100° F.

| ACI | Dose (GPT) | Metal | Time (hours) | KI (PPT) | Average Corrosion (lb/ft$^2$) | Pitting Number | Pitting Description |
|---|---|---|---|---|---|---|---|
| Inhibitor A.3 | 1 | N80 | 72 | 0 | 0.0056 | 1 | Very slight edge corrosion |
| Commercial A | 1 | N80 | 72 | 0 | 0.0018 | 0 | General Corrosion |
| Inhibitor A.3 | 2 | Cr13 | 72 | 0 | 0.0039 | 0 | General Corrosion |
| Commercial A | 2 | Cr13 | 72 | 0 | 0.0024 | 0 | General Corrosion |
| Inhibitor A.3 | 1 | CT900 | 72 | 0 | 0.0026 | 0 | General Corrosion |
| Commercial A | 1 | CT900 | 72 | 0 | 0.0016 | 0 | General Corrosion |

TABLE 8

Corrosion Inhibitor Data at 3000 psi, 28% HCl

| ACI | Dose (GPT) | Metal | Time (hours) | Temp. (° F.) | KI (PPT) | Average Corrosion (lb/ft$^2$) | Pitting Number | Pitting Description |
|---|---|---|---|---|---|---|---|---|
| Inhibitor A.3 | 20 | N80 | 16 | 200 | 10 | 0.0221 | 0 | General Corrosion |

TABLE 8-continued

Corrosion Inhibitor Data at 3000 psi, 28% HCl

| ACI | Dose (GPT) | Metal | Time (hours) | Temp. (° F.) | KI (PPT) | Average Corrosion (lb/ft$^2$) | Pitting Number | Pitting Description |
|---|---|---|---|---|---|---|---|---|
| Inhibitor A.3 | 30 | Cr13 | 16 | 200 | 10 | 0.0361 | 0 | General Corrosion |
| Inhibitor A.3 | 20 | CT900 | 16 | 200 | 20 | 0.0190 | 0 | General Corrosion |
| Inhibitor A.3 | 5 | N80 | 72 | 100 | 0 | 0.0266 | 0 | General Corrosion |
| Inhibitor A.3 | 8 | Cr13 | 72 | 100 | 0 | 0.0381 | 0 | General Corrosion |
| Inhibitor A.3 | 5 | CT900 | 72 | 100 | 0 | 0.0073 | 0 | General Corrosion |

Example 9

Environmental Profiles

The environmental impact of industrial production chemicals is indicated by their aquatic toxicity, bioaccumulation potential, and biodegradability. The regulations that govern the North Sea offshore region are considered to be the most stringent and laid out by OSPAR. OSPAR requires three ecological and toxicity tests for all components of a product proposed for use: (i) acute toxicity, (ii) bioaccumulation, (iii) and biodegradation in seawater. For a chemical to be used without restriction in the North Sea, two of the following three specific criteria must be met:

(i) acute toxicity to the most sensitive marine species (*skeletonema costatum*) must be greater than EC$_{50}$ of 10 mg/L; (ii) bioaccumulation potential (as indicated by Log P$_{ow}$, the octanol-water partition coefficient) must be below 3 or the molecular weight must be greater than 700; and (iii) biodegradation in 28 days is greater than 60%. Corrosion inhibitor intermediates such as the quaternary ammonium salt were tested for their level of acute aquatic toxicity (Table 9), Log P$_{ow}$ (Table 10), and their ability to biodegrade in 28 days (Table 10). These results show the ecological and toxicity profile for two environmentally friendly corrosion inhibitor intermediates of the invention (Compounds 1 and 4) compared to an existing chemistry intermediate, Intermediate B.

TABLE 9

Experimental Acute Aquatic Toxicity

| | *Skeletonema costatum* 72 h EC$_{50}$ (mg/l)[1] | *Acartia tonsa* 48 h LC$_{50}$ (mg/l)[2] | *Corophium volutator* 10 d LC$_{50}$ (mg/kg)[3] |
|---|---|---|---|
| Intermediate B | 2.6 | 3.3 | NT[4] |
| Compound 1 | 13.13 | NT[4] | NT[4] |
| Compound 4 | 65.06 | 105.19 | 6116.15 |

[1]Method: ISO 10253;
[2]Method: ISO 146669;
[3]Method: PARCOM;
[4]NT = Not Tested

TABLE 10

Log P$_{ow}$ and Biodegradation

| | Log P$_{ow}$[5] | Biodegradation (28 days) |
|---|---|---|
| Intermediate B | 5.1 | 23%[6] |
| Compound 1 | 2.7 | 75%[7] |
| Compound 4 | 2.1 | 40%[7] |

[5]Method: OECD 117;
[6]Method: OECD 306;
[7]Method: Marine BODIS

As shown in Tables 9-10, Intermediate B does not pass the three North Sea criteria because it has a biodegradability of 23% after 28 days in seawater, a Log P$_{ow}$ greater than 3, and aquatic toxicity of less than 10 mg/L for the most sensitive marine species (*Skeletonema costatum*). It can be seen that Compounds 1 and 4 have an improved ecological and toxicity profile as compared to Intermediate B. Compounds 1 and 4 pass at least two of the three criteria because they have a Log P$_{ow}$ less than 3 and aquatic toxicity of more than 10 mg/L for the most sensitive marine species (*Skeletonema costatum*). Furthermore, Compound 1 passed all three criteria since it had a biodegradability of greater than 60% in 28 days. Therefore, Compounds I and 4 represent environmentally friendly alternatives to Intermediate B. These intermediates when blended with additional components that are Norway yellow according to the three set of criteria will create an acid corrosion formulation that can be considered Norway yellow.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of inhibiting corrosion of a surface in contact with a corrosive environment encountered in oil and gas operations, the method comprising: contacting the surface with a composition comprising a quaternary nitrogen-containing corrosion inhibitor having the general formula:

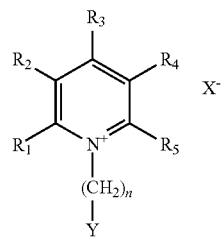

wherein: (i) n is an integer from 1 to 4; (ii) $R_1$, $R_2$, $R_3$, $R_4$, and $R_5$ are each independently selected from —C(=O)NH($R_8$), tetrazolyl, —N(H)C(=O)$R_8$, —CO$_2$H, —CO$_2R_6$, —C(=O)NH$_2$, and —C(=O)NR$_7R_8$ wherein $R_6$ is a $C_1$-$C_8$ alkyl or phenyl, $R_7$ is H or a $C_1$-$C_4$ alkyl, $R_8$ is H or a $C_1$-$C_4$ alkyl, W is 1 or 2, and X is 1 or 2; (iii) Y is selected from napthyl, benzyl, anthracyl, phenanthrinyl, substituted napthyl, substituted benzyl, substituted anthracyl, substituted phenanthrinyl, and combinations thereof; and (iv) $X^-$ is a counterion with a charge sufficient to balance the positive charge on the parent compound of the general formula; and
wherein the composition retains dispersibility in an acidic environment.

2. The method of claim 1, wherein said substituent groups in the substituted napthyl, substituted benzyl, substituted anthracyl, and substituted phenanthrinyl comprise groups selected from: cyano, amino, aminoalkyl, cycloalkyl, aryl, arylalkyl, and combinations thereof.

3. The method of claim 1, wherein Y is selected from: substituted benzyl, substituted naphthalenyl, substituted anthracyl, substituted phenanthrinyl, and combinations thereof.

4. The method of claim 1, wherein said substituent groups in the substituted napthyl, substituted benzyl, substituted anthracyl, and substituted phenanthrinyl comprise groups selected from: alkyl, alkoxy, hydroxyl, ester, and combinations thereof.

5. The method of claim 1, wherein Y is selected from: benzyl, naphthyl, anthracyl, phenanthrinyl, and combinations thereof.

6. A method of inhibiting corrosion of a surface in contact with a corrosive environment encountered in oil and gas operations, the method comprising: contacting the surface with a composition comprising a quaternary nitrogen-containing corrosion inhibitor selected from at least one of the structures:

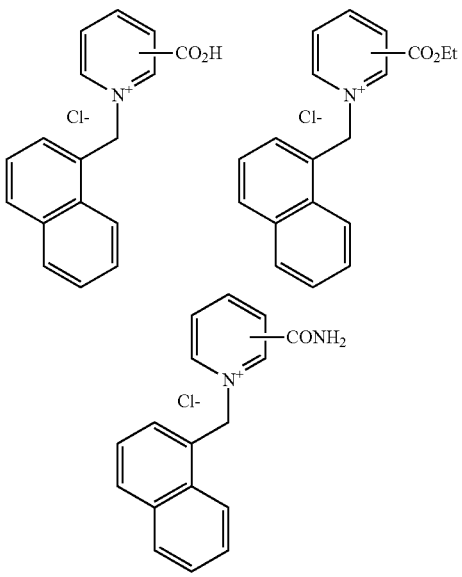

and wherein the composition retains dispersibility in an acidic environment.

7. The method of claim 1, wherein the composition further comprises a solvent selected from: polar aprotic solvents, esters, aromatic solvents, terpenoids, terpenes, ionic solvents, acetals, alcohols, and combinations thereof.

8. The method of claim 7, wherein the solvent is selected from: glycerine; ethyl lactate; propylene glycol; 1,3-propanediol; ethylene glycol; water; and combinations thereof.

9. The method of claim 1, wherein the composition further comprises at least one additional component which is a surfactant.

10. The method of claim 1, wherein the composition further comprises at least one intensifier.

11. The method of claim 10, wherein the intensifier is selected from: formic acid, formic acid compounds, α, β -unsaturated aldehydes, iodide salts, acetylenic alcohols, and combinations thereof.

12. The method of claim 1, wherein the composition comprises from about 0.1 to about 80% by weight of the quaternary nitrogen-containing corrosion inhibitor.

13. The method of claim 8, wherein the composition comprises from about 1 to about 70% weight percent of the solvent.

14. The method of claim 9, wherein the composition comprises from about 0.01 to about 30% by weight of the surfactant.

15. The method of claim 11, wherein the composition comprises from about 0.1 to about 60% weight percent of the intensifier.

16. The method of claim 1, wherein the quaternary nitrogen-containing corrosion inhibitor comprises at least one North Sea criterion selected from: (i) a biodegradation rate of greater than 60%, (ii) Log $P_{ow}$ of less than 3; (iii) acute aquatic toxicity of greater than 10 mg/L; and combinations thereof.

17. The method of claim 1, wherein the counterion is selected from at least one of the following: halides; hexafluorophosphates; nitrates; nitrites; acetates; bicarbonates; cyanides; perchlorates; hydroxides; sulfates; sulfites; mesylates; and combinations thereof.

* * * * *